US006457406B1

(12) United States Patent
Yonezawa et al.

(10) Patent No.: US 6,457,406 B1
(45) Date of Patent: Oct. 1, 2002

(54) OVERLOAD PROTECTOR FOR MECHANICAL PRESS

(75) Inventors: Keitaro Yonezawa, Kobe (JP); Tsutomu Shirakawa, Kobe (JP)

(73) Assignee: Kabushiki Kaisha Kosmek, Hyogo (JP)

(*) Notice: Subject to any disclaimer, the term of this patent is extended or adjusted under 35 U.S.C. 154(b) by 0 days.

(21) Appl. No.: 09/534,015

(22) Filed: Mar. 24, 2000

(30) Foreign Application Priority Data

Mar. 26, 1999 (JP) .......................................... 11-082748

(51) Int. Cl.[7] .................................................. F16P 5/00

(52) U.S. Cl. .................. 100/346; 100/269.14; 72/21.5; 72/453.13

(58) Field of Search ........................... 100/346, 269.14; 72/21.5, 19.9, 453.1, 453.13; 192/150; 83/543, 639.1

(56) References Cited

U.S. PATENT DOCUMENTS 2,616,543 A * 11/1952 Danly ........................ 192/150
4,085,669 A 4/1978 Yonezawa
4,172,415 A * 10/1979 Baltschun ................... 100/346
4,289,066 A * 9/1981 Proga ......................... 100/346
4,827,839 A * 5/1989 Yonezawa et al. .......... 100/346
5,620,024 A 4/1997 Yonezawa
5,638,748 A * 6/1997 Daniel ........................ 100/346

FOREIGN PATENT DOCUMENTS

DE 3810490 A1 * 10/1989 ................. 100/346
JP 0151199 * 6/1991 ................. 100/346
JP UM6-18720 5/1994
SU 0742165 * 6/1980 ................. 100/346

* cited by examiner

*Primary Examiner*—Stephen F. Gerrity
*Assistant Examiner*—Louis Huynh
(74) *Attorney, Agent, or Firm*—Bacon & Thomas, PLLC

(57) ABSTRACT

Two hydraulic chambers (3*a*),(3*b*) within a slide (2) communicate with an overload protecting valve (12) through relief passages (11*a*),(11*b*). Check valves (13*a*),(13*b*) and discharge valves (14*a*),(14*b*) are arranged in series with each other in the respective relief passages (11*a*),(11*b*). When either of the two hydraulic chambers (3*a*),(3*b*) has a pressure not less than a set overload pressure, the overload protecting valve (12) opens to relieve pressurized oil within the hydraulic chamber (3*a*) to an exterior area via a restricting passage (78) of one discharge valve (14*a*) and the overload protecting valve (12). This switches over the two discharge valves (14*a*),(14*b*) to a discharging condition substantially at the same time to communicate the hydraulic chambers (3*a*),(3*b*) with a discharge port (R).

11 Claims, 5 Drawing Sheets

OVERLOAD PROTECTOR FOR MECHANICAL PRESS

BACKGROUND OF THE INVENTION

1. Technical Field

The present invention relates to an overload protector for a mechanical press and more particularly to an overload protector which is used in a mechanical press of multi-point type having a slide connected to a crank shaft through a plurality of connecting rods.

2. Description of Prior Art

There is a conventional overload protector recited in Japanese Utility Model Publication No. 6-18720 as an example of the overload protector of this type. The conventional overload protector is constructed as follows.

Two overload absorbing hydraulic chambers are formed within a slide. The respective hydraulic chambers have pressure receiving members vertically movably inserted thereinto. The pressure receiving members are connected to a crank shaft through connecting rods. The pressure receiving members each has a closing contact portion on its upper end surface. The closing contact portion is brought into closing contact with an under surface of an upper wall of the hydraulic chamber through pressurized oil charged into the hydraulic chamber. When the pressure receiving member descends with respect to the slide by overload imposed during a press working, the closing contact portion opens to relieve the pressurized oil of the hydraulic chamber to an oil reservoir, thereby absorbing the overload.

In order to prevent the leakage of the pressurized oil from the closing contact portion during a normal operation with no overload imposed, the closing contact portion must be precisely machined. However, being provided on the pressure receiving member of a large diameter, the closing contact portion invites a difficulty in handling and requires much labor for its precise machining. Besides, the closing contact portion has to be formed for each of a plurality of pressure receiving members provided in accordance with point number of the mechanical press. This lengthens the time necessary for machining and therefore increases the production cost of the conventional overload protector.

Further, with the conventional overload protector, when overload is imposed on one hydraulic chamber during the press working, the one hydraulic chamber immediately performs an overload operation as mentioned above. On the other hand, the other hydraulic chamber performs an overload operation through a relief valve and a plurality of pipes, which delays its overload operation. As a result, the two hydraulic chambers perform overload operations with a time lag caused therebetween to thereby incline the slide. This entails a likelihood to damage a guiding portion, a driving system or the like of the slide.

SUMMARY OF THE INVENTION

The present invention has an object to provide an overload protector which can assure a reliable operation and be manufactured at a low cost.

In order to accomplish the object, the present invention has constructed an overload protector for a mechanical press in the following manner, for example, as shown in FIGS. 1 to 5.

The overload protector comprises a plurality of overload absorbing hydraulic chambers 3$a$,3$b$ provided within a slide 2 of a mechanical press 1 and a plurality of relief passages

11$a$,11$b$ communicating the respective hydraulic chambers 3$a$,3$b$ with an overload protecting valve 12. Check valves 13$a$,13$b$ and discharge valves 14$a$,14$b$ are arranged in series with each other in the respective relief passages 11$a$,11$b$. The respective check valves 13$a$,13$b$ inhibit flow from a meeting portion (A) of the relief passages 11$a$,11$b$ to the respective hydraulic chambers 3$a$,3$b$. The respective discharge valves 14$a$,14$b$ are arranged so as to be able to switch over to a normal condition where they communicate the respective hydraulic chambers 3$a$,3$b$ with the overload protecting valve 12 and to a discharging condition where they communicate the respective hydraulic chambers 3$a$,3$b$ with a discharge port (R). When each of the hydraulic chambers 3$a$,3$b$ has a pressure lower than a set overload pressure, the overload protecting valve 12 is kept closed and the respective discharge valves 14$a$,14$b$ are held in the normal condition. Conversely, when any one of the hydraulic chambers 3$a$,3$b$ has a pressure not less than the set overload pressure, the overload protecting valve 12 opens to relieve pressurized oil within the overloaded hydraulic chamber (3$a$,3$b$) to an exterior area through flow resistance applying means 78 of the corresponding discharge valve (14$a$,14$b$), the meeting portion (A) and the overload protecting valve 12 in order. The discharge valves 14$a$,14$b$ switch over to the discharging condition based on the fact that the meeting portion (A) reduces its pressure due to flow resistance of the pressurized oil passing through the flow resistance applying means 78.

The present invention operates in the following manner, for example, as shown in FIG. 1 as well as in FIGS. 5($a$) to 5($c$).

In a state where the slide 2 has returned from a bottom dead center to a top dead center, the hydraulic chambers 3$a$,3$b$ are charged with pressurized oil of a set charging pressure.

When the slide 2 descends from the top dead center to the bottom dead center and effects a press working of a work in the vicinity of the bottom dead center, a working reaction force increases the pressure of the hydraulic chambers 3$a$,3$b$.

During the press working, with no overload imposed on the respective hydraulic chambers 3$a$,3$b$, as shown in FIG. 5($a$), pressure ports (Pa),(Pb) each has a pressure which is a normal operation pressure ($P_0$) lower than the set overload pressure. The overload protecting valve 12 is kept closed and the two discharge valves 14$a$,14$b$ are also closed.

During the press working, when an eccentric working reaction force acts on the slide 2 to increase the pressure of one hydraulic chamber 3$a$ and the pressure port (Pa), the pressurized oil of the thus increased pressure opens one check valve 13$a$ to flow out to the meeting portion (A). However, the other check valve 13$b$ inhibits its flow-out from the meeting portion (A) to the other hydraulic chamber 3$b$. Conversely, when the eccentric working reaction force increases the pressure of the other hydraulic chamber 3$b$ and the pressure port (Pb), the pressurized oil of the thus increased pressure opens the other check valve 13$b$ to flow out to the meeting portion (A). However, the one check valve 13$a$ prevents its flow-out from the meeting portion (A) to the one hydraulic chamber 3$a$.

During the press working, if overload is imposed on one hydraulic chamber 3$a$ for any reason, as shown in FIG. 5($b$), one pressure port (Pa) has its pressure increased to an abnormal pressure ($P_1$) not less than the set overload pressure. Then the abnormal pressure ($P_1$) opens the overload protecting valve 12 to discharge the pressurized oil within the one pressure port (Pa) to an exterior area through the flow resistance applying means 78 of the discharge valve 14*a*, the meeting portion (A) and the overload protecting valve 12. Then the meeting portion (A) rapidly reduces its pressure due to flow resistance of the pressurized oil passing through the flow resistance applying means 78. This enlarges a differential pressure between the respective pressure ports (Pa),(Pb) and the meeting portion (A).

Therefore, as shown in FIG. 5(*c*), both of the discharge valves 14*a* and 14*b* switch over to the discharging condition substantially at the same time, thereby discharging the pressurized oil within the respective hydraulic chambers 3*a*,3*b* to the discharge port (R) via the pressure ports (Pa),(Pb) and the discharge valves 14*a*,14*b* . This results in allowing the hydraulic chambers 3*a*,3*b* to vertically contract and thereby enabling them to absorb the overload.

Also in the event overload is imposed on the other hydraulic chamber 3*b*, similarly as above, the discharge valves 14*b*,14*a* switch over to the discharging condition substantially at the same time to promptly discharge the pressurized oil within the hydraulic chambers 3*b*,3*a*. This results in enabling them to absorb the overload.

The present invention produces the following effects.

As mentioned above, the pressurized oil within the hydraulic chambers can be discharged substantially at the same time by switching over the discharge valves to the discharging condition based on a relief operation of the overload protecting valve. Thus it is possible to prevent the inclination of the slide when an eccentric overload is imposed thereon. As a result, this can prevent a guide portion, a driving system or the like of the slide from being damaged.

Differently from the closing contact portion of the above-mentioned conventional overload protector, the overload protecting valve and the discharge valve are satisfactory if each of them has a bore diameter to quickly discharge the pressurized oil of the hydraulic chamber. This can make them compact and easy to handle and reduce the labor for their precise machining, which warrants a sure and highly accurate overload operation. In addition, since it is sufficient if at least one of the overload protecting valve is provided, the overload protector of the present invention is inexpensive, when compared with the conventional one which requires a plurality of closing contact portions.

In consequence, the overload protector of the present invention can assure a reliable operation and be manufactured at a low cost.

Besides, when the slide slightly inclines with an eccentric load imposed thereon while the mechanical press is in normal operation, as mentioned above, the check valve can inhibit the movement of the pressurized oil from a hydraulic chamber which has a high pressure with its pressure increased by the eccentric load, to a hydraulic chamber of a low pressure. This can prevent the slide from further inclining due to pressure increase of the hydraulic chamber of the low pressure.

As a result, the slide experiences only a slight inclination to thereby improve the positioning accuracy at the bottom dead center of the slide. This leads to an increase of the working accuracy.

According to an embodiment of the present invention, the invention is preferably constructed In the following manner, for example, as shown in FIGS. 1 to 5.

Each of the discharge valves 14*a*,14*b* comprises a discharge valve seat 71 communicating with any one of the hydraulic chambers 3*a*,3*b*, a bypass member 73 which makes an opening and closing movement to the discharge valve seat 71, a resilient means 75 for urging the bypass member 73 to the discharge valve seat 71, a restricting passage 78 provided within the bypass member 73 so as to compose the flow resistance applying means and communicating with the discharge valve seat 71, and an actuation chamber 77 for valve closing which communicates with an outlet of the restricting passage 78 and pressurizes the bypass member 73 for closing. The actuation chamber 77 has a pressurizing sectional area (Y) set to a value larger than that of a sealing sectional area (X) of the discharge valve seat 71.

This embodiment of the invention operates in the following manner, for example, as shown in FIG. 4 as well as in FIGS. 5(*a*) to 5(*c*).

As shown in FIGS. 4 and 5(*a*), in a state where the pressure port (Pa) has a pressure which is the normal operation pressure ($P_0$) lower than the set overload pressure, the pressurized oil within the discharge valve seat 71 produces a valve opening force which is overcome by a force resultant from a pressurizing force for valve closing that the pressurized oil within the actuation chamber 77 for valve closing of the discharge valve 14*a* produces and an urging force of the resilient means 75 to bring the bypass member 73 into closing contact with the discharge valve seat 71.

As shown in FIG. 5(*b*), when the pressure port (Pa) has its pressure increased to the abnormal pressure ($P_1$) not less than the set overload pressure, the abnormal pressure ($P_1$) rapidly opens the overload protecting valve 12 to discharge the pressurized oil within the pressure port (Pa) to the exterior area via the restricting passage 78 within the bypass member 73, the actuation chamber 77 for valve closing and the overload protecting valve 12. Simultaneously, the actuation chamber 77 quickly reduces its pressure due to flow resistance of the pressurized oil passing through the restricting passage 78. Accordingly, the valve opening force produced by the pressurized oil within the discharge valve seat 71 becomes larger than the force resultant from the pressurizing force for valve closing produced by the pressurized oil within the actuation chamber 77 and the urging force of the resilient means 75.

The above differential force separates the bypass member 73 from the discharge valve seat 71 to discharge the pressurized oil within the discharge valve seat 71 to the discharge port (R) as shown in FIG. 5(*c*).

This embodiment of the invention produces the following effect.

The actuation chamber for valve closing reduces its pressurizing force for valve closing interlockingly with the relief operation of the overload protecting valve, thereby immediately separating the bypass member from the discharge valve seat. This can switch over the discharge valve to the discharging condition surely and promptly.

Further, the restricting passage within the bypass member can apply flow resistance to result in the possibility of making the discharge valve compact.

According to another embodiment of the present invention, the invention is preferably constructed in the following manner, for example, as shown in FIG. 4.

Arranged in a radially outer space of the discharge valve seat 71 between an interior area of the discharge valve seat 71 and the discharge port (R) is a fitting wall 80 with which the bypass member 73 fits by a predetermined length at a final time of its closing movement. A fitting portion 80*a* of the fitting wall 80 defines an inner space which forms a valve-opening holding chamber 81. The valve-opening holding chamber 81 has a pressurizing sectional area (Z) set to a value larger than that of the pressurizing sectional area (Y) of the actuation chamber 77 for valve closing.

This embodiment of the invention operates in the following manner, for example, as shown in FIGS. 5(*c*) and 5(*d*).

As shown in FIG. 5(*c*), rapid separation of the bypass member 73 from the discharge valve seat 71 quickly reduces the pressure of the pressure port (Pa) to thereby start the overload protecting valve 12 closing. Then the actuation chamber 77 has its inner pressure increased to a value near that of an inner pressure of the discharge valve seat 71. The thus increased pressurizing force for valve closing of the pressurized oil within the actuation chamber 77 pushes the bypass member 73 in a closing direction.

However, as shown in FIG. 5(*d*), just before a leading end of the bypass member 73 starts fitting with a front end of the fitting wall 80, the valve-opening holding chamber 81 has its pressure increased to a value near that of the inner pressure of the discharge valve seat 71. The thus increased inner pressurizing force of the valve-opening holding chamber 81 retains the bypass member 73 separated from the discharge valve seat 71. And the pressurized oil of the pressure port (Pa) is discharged to the discharge port (R) via the interior area of the discharge valve seat 71, the valve-opening holding chamber 81 and the separating gap in order. When the pressure port (Pa) has almost lost its pressure, the urging force of the resilient means 75 brings the bypass member 73 into closing contact with the discharge valve seat 71.

This embodiment of the invention produces the following effect.

The bypass member is pressurized for opening by the pressure of the valve-opening holding chamber once it opens and therefore is kept open irrespective of the overload protecting valve being opened and closed. This can smoothly and quickly discharge the abnormal pressure of the hydraulic chamber without hunting.

According to yet another embodiment of the present invention, the. respective discharge valves 14*a*,14*b* and the respective check valves 13*a*,13*b* are preferably arranged in order from the respective hydraulic chambers 3*a*,3*b* toward the meeting portion (A).

According to this embodiment of the invention, a plurality of check valves can define the meeting portion into a narrow space. This results in decreasing an amount of the pressurized oil residual on an inlet side of the overload protecting valve and therefore enabling the overload protecting valve to perform its operation quickly.

According to yet another embodiment of the present invention, the respective check valves 13*a*,13*b* are preferably attached within the bypass members 73,73 of the discharge valves 14*a*,14*b*.

This embodiment of the invention decreases a residual amount of the pressurized oil interposing between the discharge valve and the check valve, thereby switching over the discharge valve promptly and besides making the overload protector compact in its entirety.

According to yet another embodiment of the present invention, the overload protecting valve 12, the discharge valves 14*a*,14*b* and the check valves 13*a*,13*b* are preferably incorporated Into a common block 36.

This embodiment of the invention decreases a residual amount of the pressurized oil interposing between plural kinds of valves, thereby shortening the operation time of the overload protecting valve and additionally preventing a time lag from occurring in the operation timing of the discharge valve.

BRIEF DESCRIPTION OF THE DRAWINGS

FIG. 1 is a whole system diagram of an overload protector;

FIG. 2 is a sectional view of an overload protector unit integrally incorporating essential constituents of the overload protector when seen in plan;

FIG. 3 is a schematic view illustrating an overload protecting valve shown in FIG. 2 while it is closing;

FIG. 4 is an enlarged view of a principal. part showing a discharge valve and a check valve shown in FIG. 2;

FIG. 5(*a*) to FIG. 5(*d*) are schematic views showing how the discharge valves operate;

FIG. 5(*a*) shows two discharge valves when they are closed;

FIG. 5(*b*) illustrate one of the discharge valves starts valve opening;

FIG. 5(*c*) shows the two discharge valves when they are fully opened; and

FIG. 5(*d*) illustrates the two discharge valves while they are closing.

DESCRIPTION OF THE PREFERRED EMBODIMENTS

Hereafter, an embodiment of the present invention is explained with reference to FIGS. 1 to 5.

Figure 1:
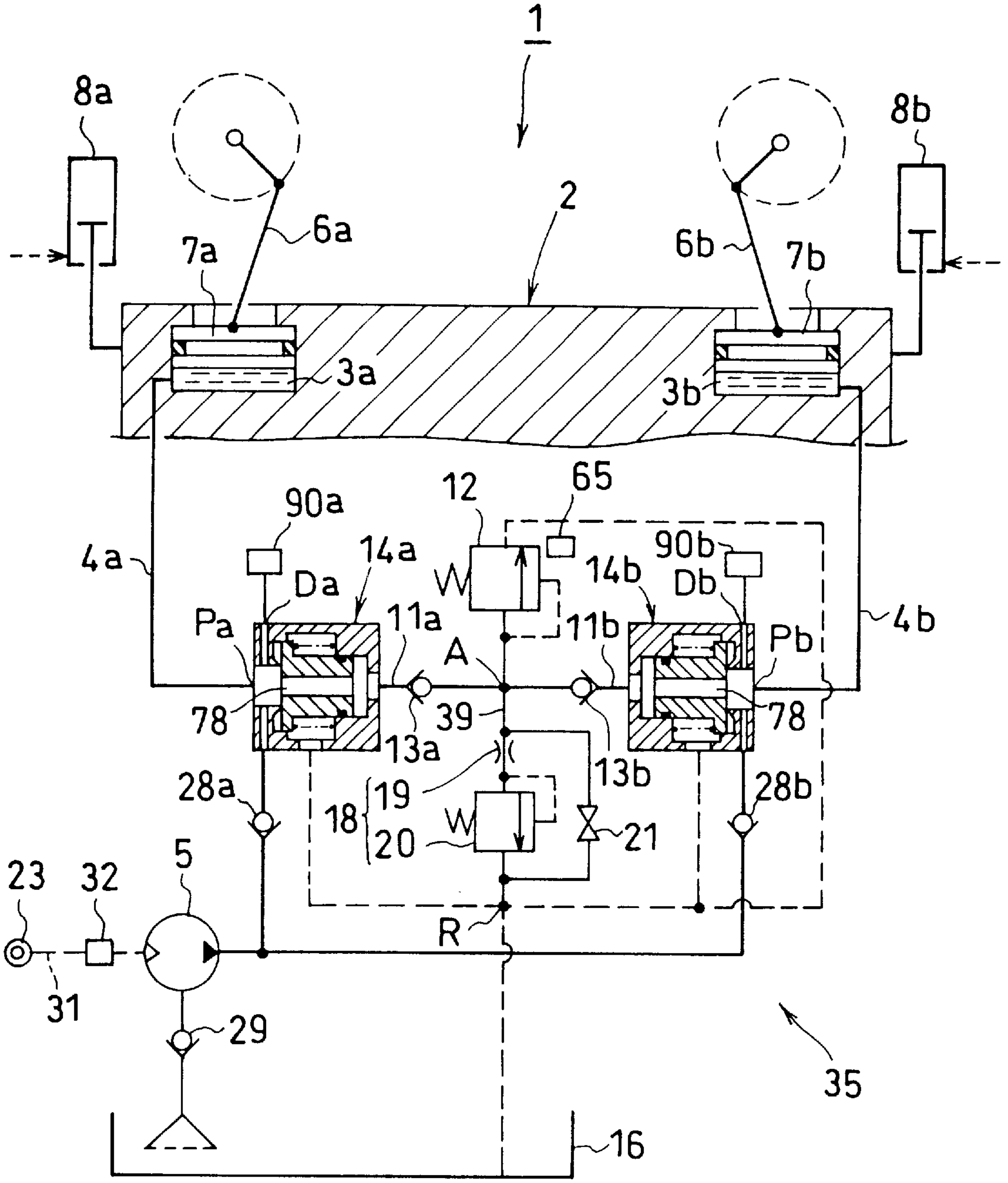
FIGS. 1 to 4 and FIGS. 5(*a*) to 5(*d*) show an embodiment of the present invention.

First an overload protector is outlined by relying on a whole system diagram of FIG. 1. This embodiment exemplifies a case where left and right two overload absorbing hydraulic chambers 3*a*,3*b* are formed within a slide 2 of a mechanical press 1 of crank type.

The respective hydraulic chambers 3*a*,3*b* are connected via pressurized oil supply passages 4*a*,4*b* to a hydraulic pump 5, which supplies pressurized oil of a set charging pressure to the hydraulic chambers 3*a*,3*b*.

The mechanical press 1 has connecting rods 6*a*,6*b*, from which a pressing force is transmitted to pistons 7*a*,7*b*. The thus transmitted pressing force is applied to a work (not shown) through the pressurized oil within the hydraulic chambers 3*a*,3*b*.

A predetermined raising force always acts on the slide 2 by pneumatic cylinders 8*a*,8*b* for counter balance.

The respective hydraulic chambers 3*a*,3*b* communicate with an overload protecting valve 12 via relief passages 11*a*,11*b* branched from mid portions of the pressurized oil supply passages 4*a*,4*b*. Character (A) designates a portion where these relief passages 11*a*,11*b* meet each other.

The respective relief passages 11*a*,11*b* have check valves 13*a*,13*b* and discharge valves 14*a*,14*b* arranged in series with each other. The check valves 13*a*,13*b* inhibit flow of the pressurized oil from the meeting portion (A) to the respective hydraulic chambers 3*a*,3*b*. The discharge valves 14*a*, 14*b* discharge the pressurized oil within the respective hydraulic chambers 3*a*,3*b* to a discharge port (R). Here the discharge valves 14*a*,14*b* and the check valves 13*a*,13*b* are arranged in order form the hydraulic chambers 3*a*,3*b* toward the meeting portion (A).

When a pressure of at least one of the left and right hydraulic chambers 3*a*,3*b* has exceeded a set overload pressure with overload imposed on the slide 2 for any reason, first the overload protecting valve 12 performs a relief operation. Based on the relief operation, the two discharge valves 14_a_,14_b_ switch over to a discharging condition substantially at the same time to discharge the pressurized oil within the hydraulic chambers 3_a_,3_b_ to an oil reservoir 16 through the discharge port (R). Thus a lowering force acting on the pistons 7_a_,7_b_ is absorbed by a compressing operation of the hydraulic chambers 3_a_,3_b_ to be not transmitted to the slide 2. As a result, overload is prevented.

The pressurized oil within the hydraulic chambers 3_a_,3_b_ undergoes a pressing force during a press working to have its temperature increased. Therefore, its pressure is increasing at a very slow speed due to volume expansion. When the very slowly increasing pressure has exceeded a set compensating pressure, a pressure compensating means 18 which comprises a restricting valve 19 and a relief valve 20 connected to each other in series, performs a relief operation, thereby discharging only the pressurized oil of an amount corresponding to the very slow pressure increase to the oil reservoir 16 via the discharge port (R). This can prevent the overload protecting valve 12 from performing an overload operation by mistake and also retain the inner pressure of the hydraulic chambers 3_a_,3_b_ within a predetermined range.

A stop valve 21 for relieving pressure is provided in parallel with the pressure compensating means 18 between the meeting portion (A) and the discharge port (R).

As regards a pushing force for valve closing of the relief valve 20, two cases are considered. In one case, it utilizes a spring force and in the other case, it employs a pressure of pressurized fluid such as compressed air.

Further, in this embodiment, the hydraulic pump 5 comprises a pneumatic and hydraulic booster pump. More specifically, a pneumatic piston (not shown) reciprocally driven by compressed air of a pneumatic source 23 is connected to a hydraulic piston 26 within a pump room 25 (see FIG. 2 as to both of them) so that oil within the oil reservoir 16 increases its pressure in accordance with a sectional area ratio between both pistons and is delivered with its pressure increased. The pressurized oil delivered from the pump room 25 is charged into the hydraulic chambers 3_a_,3_b_ through delivery valves 28_a_,28_b_. Numeral 29 indicates a suction valve.

The hydraulic pump 5 of booster type has its delivery pressure adjusted through regulating a supply pressure of compressed air by a pressure reducing valve 32 provided in a pneumatic supply passage 31.

The set charging pressure of the. hydraulic pump 5, the set compensating pressure of the pressure compensating means 18 and the set overload pressure of the overload protecting valve 12 have values set to, for example, about 10 MPa (about 100 $kgf/cm_2$), about 12 MPa (about 120 $kgf/cm_2$) and about 23 MPa (about 230 $kgf/cm_2$), respectively, although they vary depending on the capacity and usage of the mechanical press 1.

Figure 2:
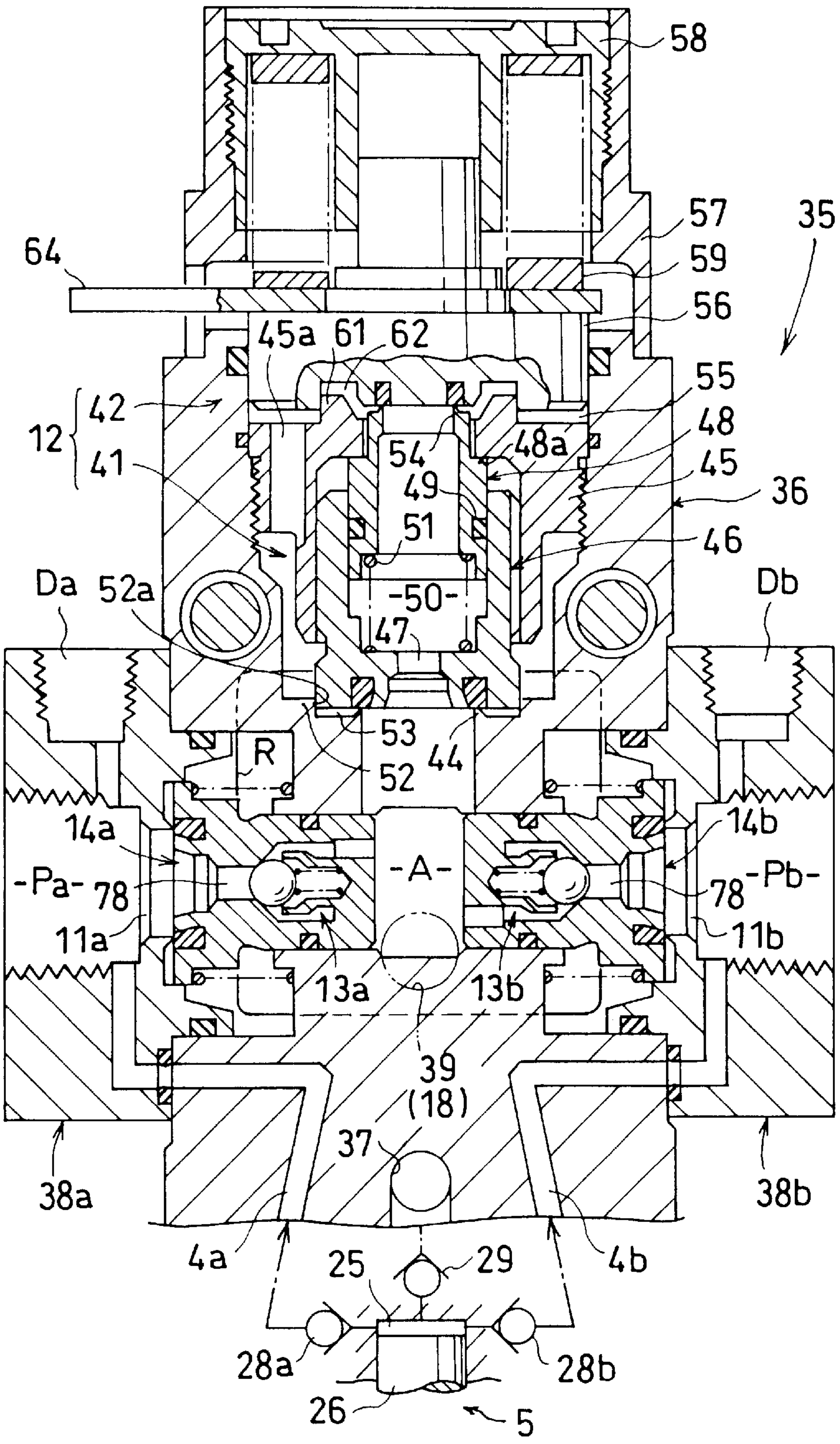
Figure 3:
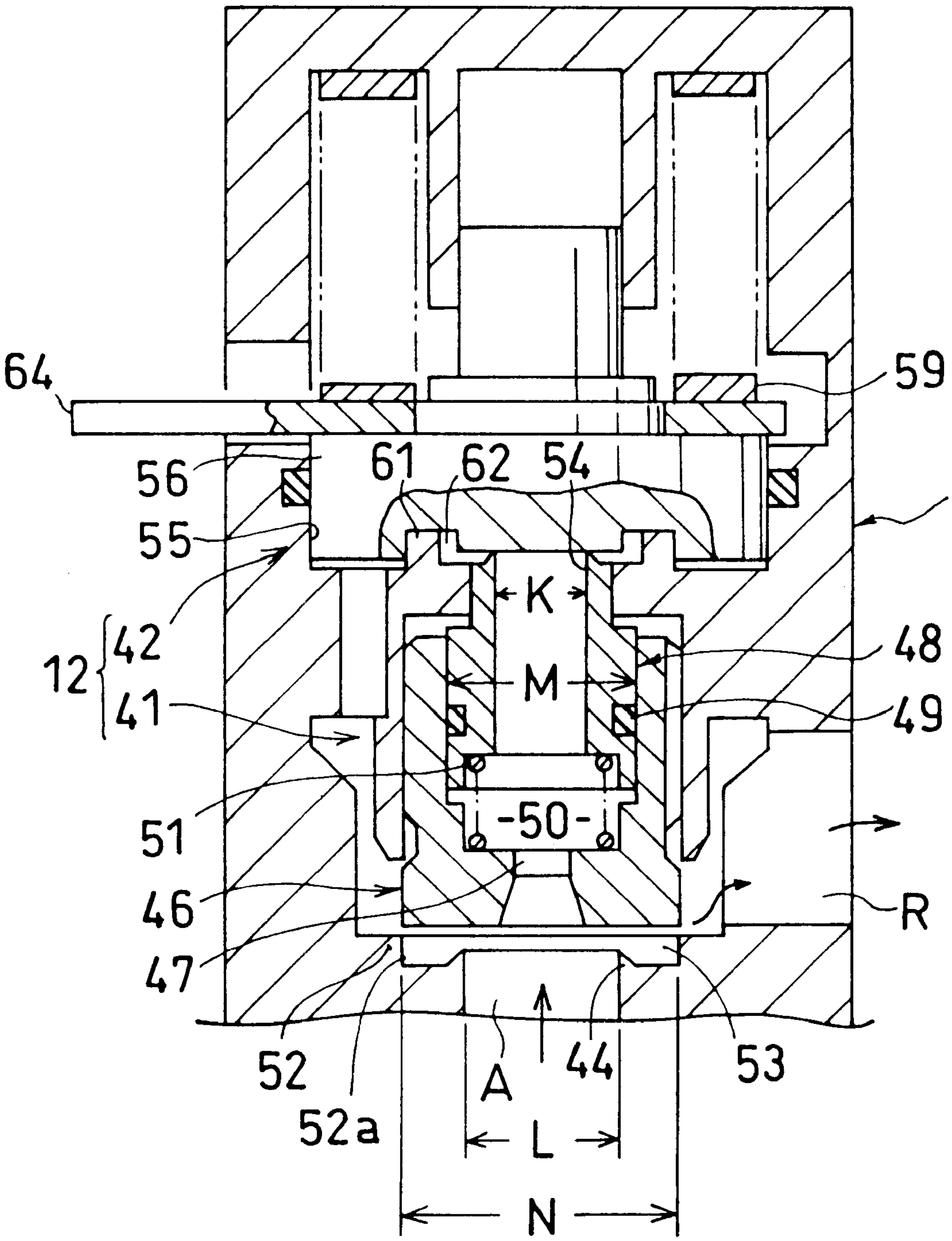
Figure 4:
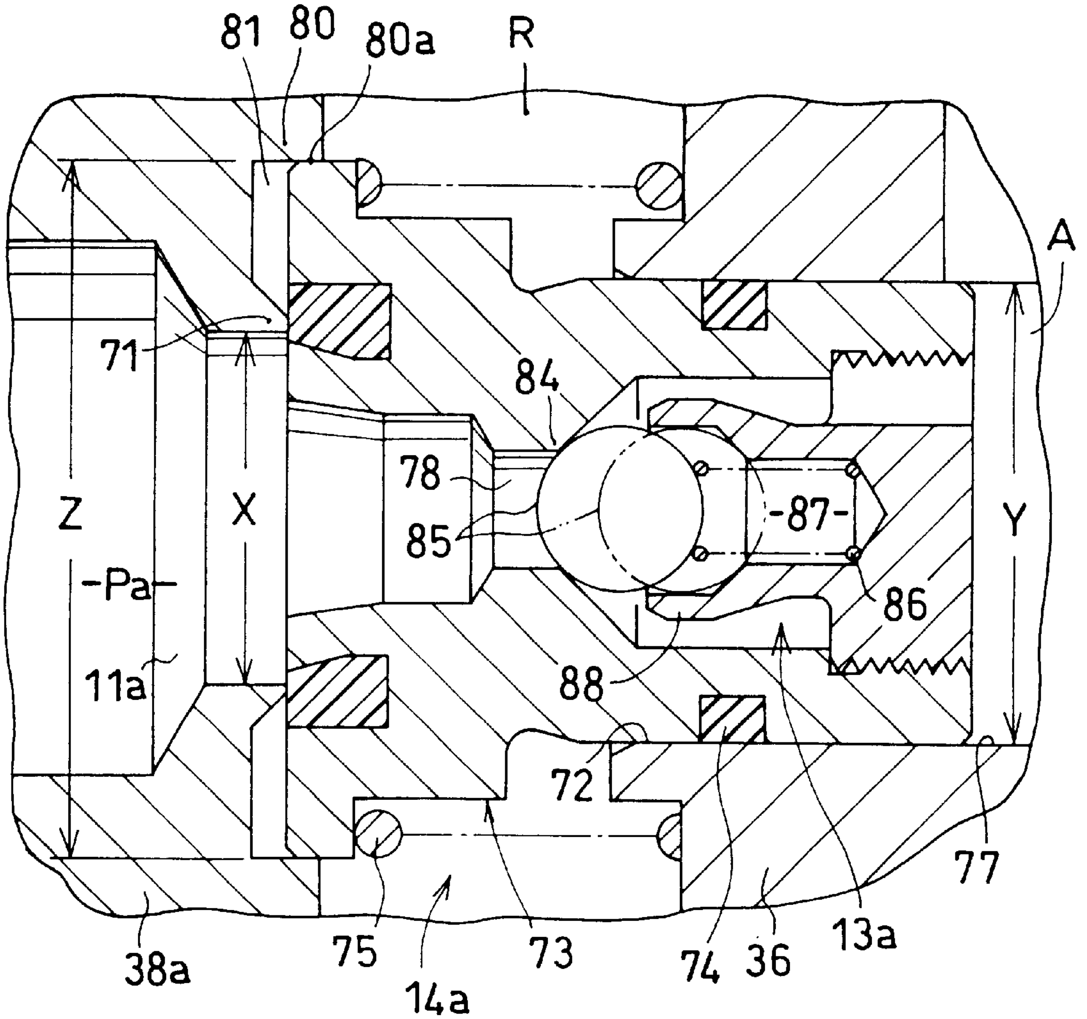
Figure 5A:
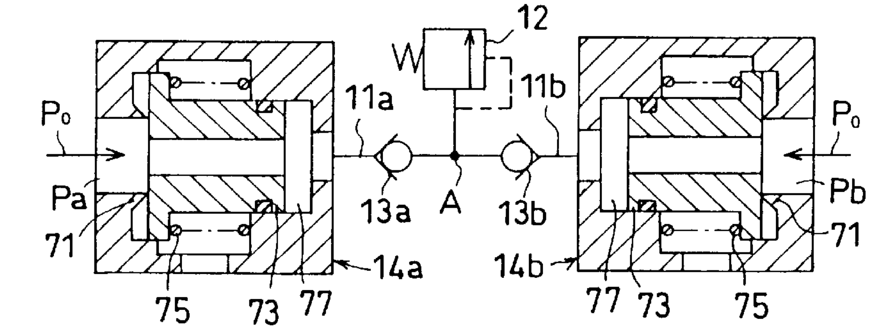
Figure 5B:
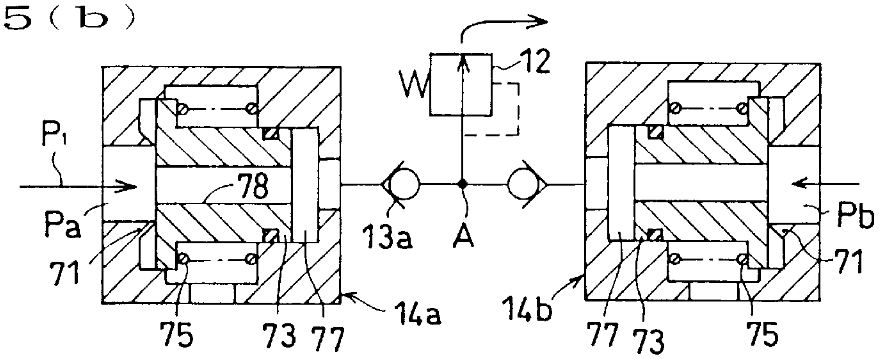
Figure 5C:
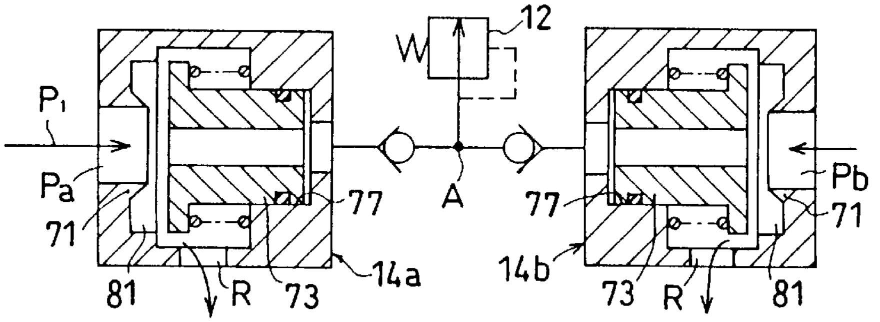
Figure 5D:
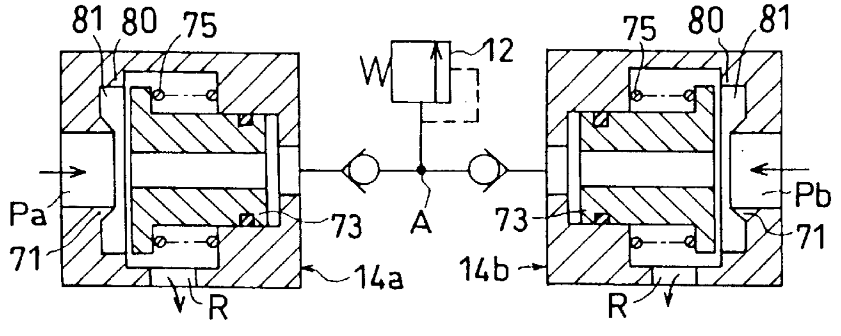

As for the overload protector of this embodiment, the above-mentioned various constituting instruments are integrally incorporated into one unit 35. Hereafter, explanation is given for a concrete structure of the overload protector unit 35 by relying on FIGS. 2 to 4 with reference to FIG. 1. FIG. 2 is a sectional view of the unit 35 when seen in plan. FIG. 3 explains how the overload protecting valve 12 shown in FIG. 2 operates. FIG. 4 is an enlarged view showing the discharge valve 14_a_ and the check valve 13_a_ shown in FIG. 2.

The overload protecting valve 12, the discharge valves 14_a_,14_b_ and the pump room 25 of the hydraulic pump 5 are arranged in a common block 36 of the unit 35. The respective check valves 13_a_,13_b_ are attached within the respective discharge valves 14_a_,14_b_. The common block 36 has a lower surface opened for providing the discharge port (R). The discharge port (R) has an edge portion of the opening to which the oil reservoir 16 is fixed (see FIG. 1). The hydraulic pump 5 has the suction valve 29 communicated with the oil reservoir 16 via a suction hole 37.

The common block 36 has left and right side surfaces to which connecting blocks 38_a_,38_b_ are fixed. The respective connecting blocks 38_a_,38_b_ have interior areas provided with pressure ports (Pa),(Pb) and detecting ports (Da),(Db) so. that they communicate with each other. The respective pressure ports (Pa),(Pb) communicate with the pressurized oil supply passages 4_a_,4_b_ as well as with the relief passages 11_a_,11_b_. The meeting portion (A) of the two relief passages 11_a_,11_b_ communicates with an inlet of the overload protecting valve 12 and with an inlet 39 of the pressure compensating means 18 (see FIG. 1).

The overload protecting valve 12 comprises a main valve 41 and a pilot valve 42.

The main valve 41 is constructed as follows.

A first closure member 46 within a support cylinder 45 makes an opening and closing movement to a first valve seat 44 communicating with the meeting portion (A). The first valve seat 44 has an interior area communicating with a restricting passage 47 formed in a cylindrical hole of the first closure member 46. Further, a slide cylinder 48 is inserted into the first closure member 46 hermetically by a sealing member 49. The sealing member 49 has a sealing surface defining an inner space which forms an actuation chamber 50 for valve closing.

A compression spring 51 attached between the slide cylinder 48 and the first closure member 46 brings the first closure member 46 into contact with the first valve seat 44 and it brings a stepped portion 48_a_ of the slide cylinder 48 into contact with a radially reduced portion of the support cylinder 45.

A peripheral wall of the first valve seat 44 has an outside portion projecting relatively to a sealing surface of the first valve seat 44. The projecting portion forms an annular fitting wall 52. The first closure member 46 fits into the fitting wall 52 by a predetermined length in an opening and closing direction. A fitting portion 52_a_ of the fitting wall 52 defines an inner space which forms a valve-opening holding chamber 53. The first valve seat 44 has the interior area able to communicate with the discharge port (R) through the valve-opening holding chamber 53 and a fitting clearance of the fitting portion 52_a_ in order.

The pilot valve 42 is constructed as follows.

The slide cylinder 48 has a leading end provided with a second valve seat 54, to which a second closure member 56 hermetically inserted into a pilot valve chamber 55 makes an opening and closing movement. A pushing spring 59 is attached between the second closure member 56 and a cap bolt 58 engaged with an outer case 57 in screw-thread fitting.

The support cylinder 45 has an end surface projecting into the pilot valve chamber 55 outside the second valve seat 54 and radially thereof. The annular projecting portion 61 has an outer peripheral surface onto which the second closure member 56 fits by a predetermined length in an opening and closing direction. The fitting portion defines an inner space which forms an accelerating chamber 62 for valve opening.

Further, in the main valve 41 and the pilot vale 42, the above-mentioned respective constituting members have sealing sectional areas related with one another as follows.

As shown in a schematic view of FIG. 3, a sealing sectional area (K) corresponding to a sealing diameter of the second valve seat 54, a sealing sectional area (L) corresponding to a sealing diameter of the first valve seat 44, a pressurizing sectional area (M) corresponding to a sealing diameter of the actuation chamber 50 and a pressurizing sectional area (N) of the valve-opening holding chamber 53 corresponding to a diameter of the fitting portion 52*a* have values enlarging one after the other in the mentioned order.

How the overload protecting valve 12 of the foregoing structure operates is explained by relying mainly on FIG. 2.

In a state where the pressurized oil at the meeting portion (A) has a pressure lower than the set overload pressure (e.g., about 23 MPa), the pushing spring 59 has a valve closing force which overcomes a valve opening force produced by the pressurized oil within the second valve seat 54 to bring the second closure member 56 into closing contact with the second valve seat 54 and the pressurized oil within the first valve seat 44 produces a valve opening force which is overcome by a force resultant from a valve closing force that the pressurized oil within the actuation chamber 50 for valve closing produces and a valve closing force of the compression spring 51 to bring the first closure member 46 into closing contact with the first valve seat 44.

When the pressurized oil at the meeting portion (A) has a pressure not less than the set overload pressure (e.g., about 23 MPa), the second closure member 56 separates from the second valve seat 54 to discharge the pressurized oil at the meeting portion (A) to the discharge port (R) through the restricting passage 47, the second valve seat 54, the accelerating chamber 62 for valve opening and a communication hole 45*a* of the support cylinder 45. Then the actuation chamber 50 for valve closing rapidly decreases its inner pressure due to flow resistance of the pressurized oil passing through the restricting passage 47 to make the valve opening force produced by the pressurized oil within the first valve seat 44, larger than the force resultant from the valve closing force that the pressurized oil within the actuation chamber 50 produces and the valve closing force of the compression spring 51.

The foregoing differential force separates the first closure member 46 from the first valve seat 44 to quickly discharge the pressurized oil within the first valve seat 44 to the discharge port (R) through the valve-opening holding chamber 53.

The discharge of the pressurized oil rapidly reduces an inner pressure of the meeting portion (A) to result in decreasing an inner pressure of the second valve seat 54. Then first a pushing force of the pushing spring 59 brings the second closure member 56 into closing contact with the second valve seat 54 to enhance an inner pressure of the actuation chamber 50 to a value near that of an inner pressure of the first valve seat 44, thereby pushing the first closure member 46 in a closing direction through the valve closing force of the pressurized oil within the actuation chamber 50.

However, as shown by the schematic view of FIG. 3, just before a leading end of the first closure member 46 starts fitting into a front end of the fitting wall 52, the valve-opening holding chamber 53 has its pressure increased to a value near that of the inner pressure of the first valve seat 44. The thus increased inner pressurizing force of the valve-opening holding chamber 53 retains the first closure member 46 separated from the first valve seat 44.

And the pressurized oil within the meeting portion (A) is discharged to the discharge port (R) through the interior area of the first valve seat 44, the valve-opening holding chamber 53 and the separating gap in order. When the meeting portion (A) has almost lost its pressure, an urging force of the compression spring 51 brings the first closure member 46 into closing contact with the first valve seat 44.

How the overload protecting valve 12 operates is judged through detecting a moving amount of an upper portion of an arm 64 attached to the second closure member 56, by a limit switch or the like sensor 65 (see FIG. 1).

The two discharge valves 14*a*,14*b* provided in the relief passages 11*a*,11*b*, respectively, are constructed similarly as well as the two check valves 13*a*,13*b* also provided therein, respectively. Therefore, a concrete explanation is given for one of the discharge valves 14a and one of the check valves 13*a* based on the enlarged view of FIG. 4.

The discharge valve 14*a* is constructed as follows.

The connecting block 38*a* is provided with a discharge valve seat 71 communicating with the pressure port (Pa). A cylindrical bypass member 73 is inserted into a support hole 72 of the common block 36 hermetically by a sealing member 74. The bypass member 73 is urged to the discharge valve seat 71 by a closing spring 75 of a resilient means. The sealing member 74 has a sealing surface defining an inner space provided with an actuation chamber 77 for valve closing. The actuation chamber 77 has a pressurizing sectional area (Y) set to a value larger than that of a sealing sectional area (X) corresponding to a sealing diameter of the discharge valve seat 71. The discharge valve seat 71 has an interior area communicating with the actuation chamber 77 for valve closing through a restricting passage 78 provided within a cylindrical hole of the bypass member 73. The restricting passage 78 composes a flow resistance applying means.

A peripheral wall of the discharge valve seat 71 has a outside portion projecting relatively to a sealing surface of the discharge valve seat 71. The projecting portion forms an annular fitting wall 80 into which the bypass member 73 fits by a predetermined length in an opening and closing direction. A fitting portion 80*a* of the fitting wall 80 defines an inner space which forms a valve-opening holding chamber 81. The discharge valve seat 71 has an interior area able to communicate with the discharge port (R) through the valve-opening holding chamber 81 and a fitting clearance of the fitting portion 80*a* in order. The valve-opening holding chamber 81 has a pressurizing sectional area (Z) set to a value larger than that of the pressurizing sectional area (Y) of the actuation chamber 77 for valve closing.

The check valve 13*a* is attached within the bypass member 73. More specifically, the restricting passage 78 has a mid portion provided with a check valve seat 84. A check spring 86 brings a ball-like check member 85 into closing contact with the check valve seat 84. The check member 85 can fit into a peripheral wall 88 of a check valve chamber 87 as shown by a two-dot chain line when it is in a fully opened state. Accordingly, when the check member 85 makes a valve closing movement from the fully opened state by the check spring 86, the check valve chamber 87 has a negative inner pressure to thereby delay the valve closing movement.

Hereafter, explanation is given as to how the discharge valves 14*a*,14*b* and the check valves 13*a*,13*b* operate, by relying on a schematic view of FIGS. 5(*a*) to 5(*d*) with reference to FIG. 1.

In a state where the slide 2 has returned from a bottom dead center to a top dead center, the hydraulic pump 5 charges pressurized oil of a set charging pressure (e.g., about 10 MPa) into the hydraulic chambers 3*a*,3*b*.

When the slide 2 descends from the top dead center to the bottom dead center and conducts a press working of a work in the vicinity of the bottom dead center, a working reaction force increases the pressure of the hydraulic chambers 3*a*,3*b*.

During the press working, in a state where overload is not imposed on both of the hydraulic chambers 3*a*,3*b*, as shown in FIG. 5(*a*), the pressure ports (Pa),(Pb) each has a pressure which is a normal operation pressure ($P_0$) (e.g., about 15 MPa) lower than the set overload pressure (e.g., about 23 MPa). The overload protecting valve 12 is kept closed and the two discharge valves 14*a*,14*b* are also closed. Speaking it in more detail, the pressurized oil within the discharge valve seat 71 produces a valve opening force, which is overcome by a force resultant from a valve closing force that the pressurized oil within the actuation chamber 77 for valve closing of each of the discharge valves 14*a*,14*b* produces and a valve closing force of the closing spring 75 to bring the bypass member 73 into closing contact with the discharge valve seat 71.

During the press working, when an eccentric working reaction force acts on the slide 2 to increase an inner pressure of one hydraulic chamber 3*a*, the pressurized oil having its pressure thus increased opens one check valve 13*a* to flow out to the meeting portion (A) but it is prevented by the other check valve 13*b* from flowing out of the meeting portion (A) to the other hydraulic chamber 3*b*. As such, the other check valve 13*b* can inhibit the movement of the pressurized oil from one hydraulic chamber 3*a* having its pressure increased with eccentric load imposed thereon, to the other hydraulic chamber 3*b*. Therefore, it is possible to prevent the inclination of the slide 2 along with the movement of the pressurized oil.

The pressure of each of the hydraulic chambers 3*a*,3*b* can be independently detected by pressure sensors 90*a*,90*b* (see FIG. 1) connected to the detecting ports (Da),(Db) respectively.

When the slide 2 ascends to the top dead center after having finished the press working, the one hydraulic chamber 3*a* is relieved from compression to decrease its pressure. Then the one check valve 13*a* makes the valve closing movement moderately due to the above-mentioned delaying action and therefore is opening for a longer period of time. Thus the pressurized oil within the meeting portion (A) moves to the one hydraulic chamber 3*a* to immediately return the one hydraulic chamber 3*a* to a state of having the set charging pressure.

Even if the other hydraulic chamber 3*b* has its pressure increased by the eccentric working reaction force acting on the slide 2, one check valve 13*a* can prevent the movement of the pressurized oil from the other hydraulic chamber 3*b* to the one hydraulic chamber 3*a*. Therefore, it is possible to inhibit the inclination of the slide 2 along with the movement of the pressurized oil. Further, when the slide 2 returns to the top dead center, the delaying action of the other check valve 13*b* moves the pressurized oil within the meeting portion (A) to the other hydraulic chamber 3*b*, thereby immediately returning the other hydraulic chamber 3*b* to the state of having the set charging pressure.

In the case where the meeting portion (A) has its pressure abnormally increased because it cannot sufficiently enjoy the delaying action of each of the check valves 13*a*,13*b* or for the like reason, the pressure compensating means 18 operates to reduce the pressure of the meeting portion (A) to not more than the set compensating pressure (e.g., 12 MPa). This can inhibit erroneous operation of the overload protecting valve 12.

In the event overload is imposed on one hydraulic chamber 3*a* while the press working is carried out in the vicinity of the bottom dead center, as shown in FIG. 5(*b*), the pressure port (Pa) has its pressure increased to an abnormal pressure ($P_1$) not less than the set overload pressure (e.g., about 23 MPa). Then the abnormal pressure ($P_1$) rapidly opens the overload protecting valve 12 as mentioned above. This discharges the pressurized oil within the pressure port (Pa) to the oil reservoir 16 (see FIG. 1) via the restricting passage 78 within the bypass member 73, the actuation chamber 77, one check valve 13*a* and the overload protecting valve 12. Simultaneously, due to flow resistance of the pressurized oil passing through the restricting passage 78, the meeting portion (A) has its pressure quickly reduced to a pressure within a range of about 0.05 MPa to 0.2 MPa. This results in making the valve opening force that the pressurized oil within the discharge valve seats 71,71 produces, larger than the resultant force from the valve closing force produced by the pressurized oil within the respective actuation chambers 77,77 for valve closing of the discharge valves 14*a*,14*b* and the valve closing force of the closing springs 75,75.

The above differential force switches over the respective discharge valves 14*a*,14*b* to a discharging condition substantially at the same time as shown in FIG. 5(*c*). More specifically, the differential force separates the bypass members 73,73 from the respective discharge valve seats 71,71 to rapidly discharge the pressurized oil within the discharge valve seats 71,71 to the oil reservoir 16 (see FIG. 1) through the valve-opening holding chambers 81,81 and the discharge port (R). Simultaneously, the pressure of the meeting portion (A) further decreases to close the overload protecting valve 12, thereby enhancing an inner pressure of the respective actuation chamber 77,77 of the discharge valves 14*a*,14*b* to a value near that of an inner pressure of the respective discharge valve seats 71,71 to push the respective bypass members 73,73 in a closing direction through the valve closing force of the pressurized oil within the actuation chambers 77,77.

However, as shown in FIG. 5(*d*), just before each of the bypass members 73,73 starts its leading end fitting into a front end of each of the fitting walls 80,80, the valve-opening holding chambers 81,81 each has its pressure increased to a value near that of the inner pressure of the discharge valve seats 71,71. Thus the valve-opening holding chambers 81,81 retain the bypass members 73,73 separated from the discharge valve seats 71,71 through their increased inner pressurizing force.

The pressurized oil within the respective hydraulic chambers 3*a*,3*b* is discharged to the discharge port (R) through the pressure ports (Pa),(Pb), interior areas of the discharge valve seats 71,71 of the respective discharge valves 14*a*,14*b*, the valve-opening holding chambers 81,81 and the separating gaps in order. When the pressure ports (Pa),(Pb) have almost lost their pressure, an urging force of the closing springs 75,75 brings the respective bypass members 73,73 into closing contact with the respective discharge valve seats 71,71.

Additionally, when overload is imposed on the other hydraulic chamber 3*b* during the press working, similarly as mentioned above, the two discharge valves 14*b*,14*a* switch over to the discharging condition substantially at the same time to immediately discharge the pressurized oil within the two hydraulic chambers 3*b*,3*a* to the oil reservoir 16.

At the time of the above overload operation, the sensor 65 (see FIG. 1) detects through the arm 64 (see FIG. 2) that the pilot valve 42 of the overload protecting valve 12 has performed a relief operation. Based on the detected signal, the mechanical press 1 makes an emergency stop and the hydraulic pump 5 stops working. And based on a signal indicating that the slide 2 has returned to the top dead center, or the like, the hydraulic pump 5 resumes its operation and charges the pressurized oil into the respective hydraulic chambers 3*a*,3*b*.

The foregoing embodiment produces the following advantages.

The first closure member 46 of the overload protecting valve 12 is kept open by the pressurizing force of the valve-opening holding chamber 53 once it opens. This can prevent the hunting of the overload protecting valve 12, thereby making it possible to inhibit the generation of abnormal pressure pulsation at the meeting portion (A) and to surely keep the discharge valves 14*a*,14*b* open.

When the mechanical press 1 has the connecting rods 6*a*,6*b* sticked (a state of being unmovably fixed) at the bottom dead center, it is sufficient to open the stop valve 21 shown in FIG. 1. Then the pressurized oil within the respective hydraulic chambers 3*a*,3*b* is discharged to the oil reservoir 16 through the discharge valves 14*a*,14*b*, the check valves 13*a*,13*b*, the stop valve 21 and the discharge port (R). Next, the discharge valves 14*a*,14*b* open to discharge the pressurized oil within the hydraulic chambers 3*a*,3*b* directly to the oil reservoir 16. This raises the slide 2 with respect to the pistons 7*a*,7*b* by the pneumatic cylinders 8*a*,8*b* to cancel the foregoing sticked state.

The above-mentioned embodiment can be modified as follows.

In the discharge valves 14*a*,14*b*, the resilient means may employ rubber or the like resilient member instead of the exemplified closing spring 75.

Further, the fitting wall 80 is sufficient if it fits with the bypass member 73 at a final time of the closing movement of the bypass member 73. In consequence, a leading end surface of the bypass member 73 may project its outer peripheral portion relatively to its mid portion instead of projecting an end surface of the fitting wall 80 relatively to a sealing surface of the discharge valve seat 71. Besides, the bypass member 73 may fit onto the fitting wall 80 instead of fitting thereinto.

Moreover, it is a matter of course that each of the flow resistance applying means of the respective discharge valves 14*a*,14*b* may be an orifice, a slender pipe or the like other means instead of the exemplified restricting passage 78.

The check valves 13*a*,13*b* may be arranged outside the respective inlets of the discharge valves 14*a*,14*b* or the respective outlets thereof instead of being housed in the discharge valves 14*a*,14*b*. Additionally, in each of the check valves 13*a*,13*b*, the above-mentioned delaying action during its valve closing movement is not limited to the exemplified structure. For instance, the check member may fit with a peripheral wall of the check valve chamber at a final time of its valve closing movement.

As for the overload protecting valve 12, the check valves 13*a*,13*b*, the discharge valves 14*a*,14*b*, the pressure compensating means 18, the hydraulic pump 5 and the oil reservoir 16, at least two of them. may be combined into one unit or all of them may be constructed by independent parts and connected to one another through piping instead of incorporating all of them into one unit.

The pressure compensating means 18 may be provided for each of the relief passages 11*a*,11*b* or each of the pressurized oil supply passages 4*a*,4*b* instead of communicating with the meeting portion (A).

The overload protecting valve 12 is satisfactory if it communicates with the meeting portion (A) of the plural relief passages 11*a*,11*b*. Therefore, the overload protecting valves 12 may be provided in plural number instead of providing a single one as exemplified.

The valve closing force of the pilot valve 42 of the overload protecting valve 12 may utilize compressed air or the like pressurized fluid instead of the pushing spring 59. In this case, when the mechanical press 1 is sticked at the bottom dead center, the pilot valve 42 opens by the pressurized oil on the inlet side through discharging the pressurized fluid for valve closing. Therefore, simultaneously with the valve opening, the plurality of discharge valves 14*a*,14*b* open to result in the possibility of discharging the pressurized oil within the plurality of hydraulic chambers 3*a*,3*b*. At this time, the aforesaid pneumatic cylinders 8*a*,8*b* raise the slide 2, thereby making it possible to secure a predetermined minimum pressure within each of the hydraulic chambers 3*a*,3*b*. The minimum pressure keeps the discharge valves 14*a*,14*b* open.

The overload protecting valve 12 may utilize various modified ones instead of the exemplified pilot-operated one.

As for the number of the overload absorbing hydraulic chambers 3*a*,3*b* to be installed within the slide 2, it may be three or at least four instead of the exemplified two. For example, in the case where four hydraulic chambers are installed, four discharge valves and four check valves are installed correspondingly.

The hydraulic pump 5 may comprise a plunger pump or the like to be driven by an electric motor instead of the illustrated one of booster type.

What is claimed is:

1. An overload protector for a mechanical press comprising:

a plurality of overload absorbing hydraulic chambers (3*a*), (3*b*) provided within a slide (2) of the mechanical press (1);

an overload protecting valve (12) opening when any one of the hydraulic chambers (3*a*), (3*b*) has a pressure not less than a set overload pressure;

a plurality of relief passages (11*a*), (11*b*) having a meeting portion (A) and communicating the respective hydraulic chambers (3*a*), (3*b*) with the overload protecting valve (12);

a plurality of check valves (13*a*), (13*b*) arranged in the respective relief passages (11*a*), (11*b*) and inhibiting flow from the meeting portion (A) to the respective hydraulic chambers (3*a*), (3*b*): and a plurality of discharge valves (14*a*), (14*b*) including flow resistance applying means (78), (78), respectively and arranged in series with the respective check valves (13*a*), (13*b*), the discharge valves (14*a*), (14*b*) switching over to a normal condition where they communicate the respective hydraulic chambers (3*a*), (3*b*) with the overload protecting valve (12) and to a discharging condition where they communicate the respective hydraulic chambers (3*a*), (3*b*) with a discharge port (R), each of said discharge valves (14*a*), (14*b*) including a discharge valve seat (71) communicating with any one of the hydraulic chambers (3*a*), (3*b*), a bypass member (73) which makes an opening and closing movement to the discharge valve seat (71), a resilient means (75) for urging the bypass member (73) to the discharge valve seat (71), a restricting passage (78) provided within the bypass member (73) so as to compose the flow resistance applying means and communicating with the discharge valve seat (71), and an actuation chamber (77) for valve dosing which communicates with an outlet of the restricting passage (78) and pressurizes the bypass member (73) for closing, the actuation chamber (77) having a pressurizing sectional area (Y) set to a value larger than that of a sealing sectional area (X) of the discharge valve seat (71), when each of the hydraulic chambers (3*a*), (3*b*) has a pressure lower than the set overload pressure, the overload protecting valve (12) being kept closed and the respective discharge valves (14*a*), (14*b*) being held in the normal condition, when any one of the hydraulic chambers (3*a*), (3*b*) has a pressure not less than the set overload pressure, the overload protecting valve (12) opening so as to relieve pressurized oil within the overloaded hydraulic chamber (3*a*, 3*b*) to an exterior area via the flow resistance applying means (78) of the corresponding discharge valve (14*a*, 14*b*), the meeting portion (A) and the overload protecting valve (12) in order, the discharge valves (14*a*), (14*b*) switching over to the discharging condition based on the fact that the meeting portion (A) reduces its pressure due to flow resistance of the pressurized oil passing through the flow resistance applying means (78).

2. The overload protector for a mechanical press as set forth in claim 1, wherein arranged in a radially outer space of the discharge valve seat (71) between an interior area of the discharge valve seat (71) and the discharge port (R) is a fitting wall (80) with which the bypass member (73) fits by a predetermined length at a final time of its closing movement, a fitting portion (80*a*) of the fitting wall (80) defining an inner space which forms a valve-opening holding chamber (81), the valve-opening holding chamber (81) having a pressurizing sectional area (Z) set to a value larger than that of the pressurizing sectional area (Y) of the actuation chamber (77) for valve closing.

3. The overload protector for a mechanical press as set forth in claim 2, wherein each of said check valves (13*a*), (13*b*) are attached within the bypass member (73) belonging to a respective one of said discharge valves (14*a*), (14*b*).

4. The overload protector for a mechanical press as set forth in claim 2, wherein the overload protecting valve (12), the discharge valves (14*a*), (14*b*) and the check valves (13*a*), (13*b*) are incorporated into a common block (36).

5. The overload protector for a mechanical press as set forth in claim 1, wherein the respective discharge valves (14*a*), (14*b*) and the respective check valves (13*a*), (13*b*) are arranged in order from the respective hydraulic chambers (3*a*), (3*b*) toward the meeting portion (A).

6. The overload protector for a mechanical press as set forth in claim 5, wherein each of said check valves (13*a*), (13*b*) are attached within the bypass member (73) belonging to a respective one of said discharge valves (14*a*), (14*b*).

7. The overload protector for a mechanical press as set forth in claim 5, wherein the overload protecting valve (12), the discharge valves (14*a*), (14*b*) and the check valves (13*a*), (13*b*) are incorporated into a common block (36).

8. The overload protector for a mechanical press as set forth in claim 2, wherein the overload protecting valve (12), the discharge valves (14*a*), (14*b*) and the check valves (13*a*), (13*b*) are incorporated into a common block (36).

9. The overload protector for a mechanical press as set forth in claim 1, wherein each of said check valves (13*a*), (13*b*) are attached within the bypass member (73) belonging to a respective one of said discharge valves (14*a*), (14*b*).

10. An overload protector for a mechanical press comprising:

a plurality of overload absorbing hydraulic chambers (3*a*), (3*b*) provided within a slide (2) of the mechanical press (1);

an overload protecting valve (12) opening when any one of the hydraulic chambers (3*a*), (3*b*) has a pressure not less than a set overload pressure;

a plurality of relief passages (11*a*), (11*b*) having a meeting portion (A) and communicating the respective hydraulic chambers (3*a*), (3*b*) with the overload protecting valve (12);

a plurality of check valves (13*a*), (13*b*) arranged in the respective relief passages (11*a*), (11*b*) and inhibiting flow from the meeting portion (A) to the respective hydraulic chambers (3*a*), (3*b*); and a plurality of discharge valves (14*a*), (14*b*) including flow resistance applying means (78), (78), respectively and arranged in series with the respective check valves (13*a*), (13*b*), the discharge valves (14*a*), (14*b*) switching over to a normal condition where they communicate the respective hydraulic chamber (3*a*), (3*b*) with the overload protecting valve (12) and to a discharging condition where they communicate the respective hydraulic chambers (3*a*), (3*b*) with a discharge port (R), each of said check valves (13*a*), (13*b*) being attached within a bypass member (73) belonging to a respective one of said discharge valves (14*a*), (14*b*), said bypass member (73) being arranged to open and close said discharge valve, when each of the hydraulic chambers (3*a*), (3*b*) has a pressure lower than the set overload pressure, the overload protecting valve (12) being kept closed and the respective discharge valves (14*a*), (14*b*) being held in the normal condition, when any one of the hydraulic chambers (3*a*), (3*b*) has a pressure not less than the set overload pressure, the overload protecting valve (12) opening so as to relieve pressurized oil within the overloaded hydraulic chamber (3*a*, 3*b*) to an exterior area via the flow resistance applying means (78) of the corresponding discharge valve (14*a*,14*b*), the meeting portion (A) and the overload protecting valve (12) in order, the discharge valves (14*a*), (14*b*) switching over to the discharging condition based on the fact that the meeting portion (A) reduces its pressure due to flow resistance of the pressurized oil passing through the flow resistance applying means (78).

11. The overload protector for a mechanical press as set forth in claim 10, wherein the overload protecting valve (12), the discharge valves (14*a*), (14*b*) and the check valves (13*a*), (13*b*) are incorporated into a common block (36).

* * * * *